United States Patent
Li et al.

(10) Patent No.: US 11,818,605 B2
(45) Date of Patent: Nov. 14, 2023

(54) METHODS, APPARATUS AND SYSTEMS FOR SATISFYING A TIME CONTROL REQUIREMENT IN A WIRELESS COMMUNICATION

(71) Applicant: ZTE Corporation, Guangdong (CN)

(72) Inventors: Zhendong Li, Shenzhen (CN); Jinguo Zhu, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/319,788

(22) Filed: May 13, 2021

(65) Prior Publication Data
US 2021/0314807 A1    Oct. 7, 2021

Related U.S. Application Data

(63) Continuation of application No. PCT/CN2018/115393, filed on Nov. 14, 2018.

(51) Int. Cl.
| | |
|---|---|
| *H04W 28/02* | (2009.01) |
| *H04J 3/06* | (2006.01) |
| *H04L 47/28* | (2022.01) |
| *H04W 28/24* | (2009.01) |
| *H04W 36/30* | (2009.01) |

(52) U.S. Cl.
CPC ....... *H04W 28/0268* (2013.01); *H04J 3/0661* (2013.01); *H04L 47/28* (2013.01); *H04W 28/24* (2013.01); *H04W 36/30* (2013.01)

(58) Field of Classification Search
CPC . H04W 28/0268; H04W 28/24; H04W 36/30; H04W 56/001; H04W 28/0205; H04W 36/0033; H04W 36/08; H04J 3/0661; H04L 47/28; H04L 47/31
See application file for complete search history.

(56) References Cited

U.S. PATENT DOCUMENTS

| | | | |
|---|---|---|---|
| 8,416,812 B2 | 4/2013 | Radulescu | |
| 9,185,592 B2 | 11/2015 | Kim et al. | |
| 9,521,679 B2 | 12/2016 | Speicher et al. | |
| 10,285,006 B2 | 5/2019 | Colonna et al. | |
| 10,405,149 B2 * | 9/2019 | Kim | H04W 4/08 |
| 10,582,559 B2 | 3/2020 | Cho et al. | |
| 2008/0101334 A1 | 5/2008 | Bakker et al. | |

(Continued)

FOREIGN PATENT DOCUMENTS

| | | |
|---|---|---|
| CN | 101174969 A | 5/2008 |
| CN | 101175039 A | 5/2008 |

(Continued)

OTHER PUBLICATIONS

International Search Report for priority application No. PCT/CN2018/115393 dated Aug. 16, 2019, 3p.

(Continued)

*Primary Examiner* — Omer S Mian
(74) *Attorney, Agent, or Firm* — Crowell & Moring LLP

(57) ABSTRACT

Methods, apparatus and systems for satisfying a time control requirement in a wireless communication are disclosed. In one embodiment, a method performed by a first network node is disclosed. The method comprises: generating a timestamp associated with downlink data to be transmitted; and transmitting the downlink data with the timestamp.

20 Claims, 5 Drawing Sheets

(56) References Cited

U.S. PATENT DOCUMENTS

| | | |
|---|---|---|
| 2010/0315995 A1 | 12/2010 | Bloomfield et al. |
| 2011/0096754 A1 | 4/2011 | Harris et al. |
| 2014/0354446 A1 | 12/2014 | Nakayama et al. |
| 2015/0189539 A1 | 7/2015 | Li et al. |
| 2015/0289287 A1* | 10/2015 | Larsson ............... H04W 72/52 370/230 |
| 2018/0213426 A1 | 7/2018 | Latheef et al. |
| 2018/0302914 A1 | 10/2018 | da Silva et al. |
| 2020/0067840 A1* | 2/2020 | Huang ................ H04L 47/56 |
| 2020/0084663 A1* | 3/2020 | Park ..................... H04W 80/02 |
| 2020/0322909 A1* | 10/2020 | Rácz ................ H04L 43/0852 |
| 2021/0075864 A1* | 3/2021 | Sun .................. H04W 36/0011 |
| 2021/0153070 A1* | 5/2021 | Velev ............... H04W 28/0268 |

FOREIGN PATENT DOCUMENTS

| | | |
|---|---|---|
| CN | 101345987 A | 1/2009 |
| CN | 102265549 A | 11/2011 |
| CN | 103119864 A | 5/2013 |
| CN | 104902518 A | 9/2015 |
| CN | 105474683 A | 4/2016 |
| CN | 105577349 A | 5/2016 |
| CN | 106921986 A | 7/2017 |
| CN | 107113561 A | 8/2017 |
| CN | 108353039 A | 7/2018 |
| CN | 108600102 A | 9/2018 |
| CN | 108632055 A | 10/2018 |
| EP | 2 928 252 A1 | 10/2015 |
| WO | WO 2014/036704 A1 | 3/2014 |
| WO | WO 2015/042117 A1 | 3/2015 |
| WO | WO 2017/023481 A1 | 2/2017 |
| WO | WO 2017/114171 A1 | 7/2017 |
| WO | WO 2018/084762 A1 | 5/2018 |
| WO | WO 2018/166379 A1 | 9/2018 |

OTHER PUBLICATIONS

Written Opinion of the International Searching Authority for priority application No. PCT/CN2018/115393 dated Aug. 16, 2019, 5p.
First Office Action with Search Report for Chinese application No. 201880099424.4 dated Mar. 3, 2022, 12p, in Chinese language.
English language translation of the First Office Action and Search Report for Chinese application No. 201880099424.4 dated Mar. 3, 2022, 14p.
Extended European Search Report for EP 18929867.2 dated Jun. 3, 2022, 13p.
Anipolis, Sophia, "3$^{rd}$ Generation Partnership Project; Technical Specification Group Services and System Aspects; Study on 5GS Enhanced support of Vertical and LAN Services", 3GPP TR 23.734 V0.3.0 Draft, Release 16, Oct. 30, 2018, 102p, France.
CATT, "PTP 1588 support in 5GS/TSN", 3GPP TSG-RAN WG2 Meeting #104, R2-1816360, Nov. 16, 2018, 5p, US.
Second Office Action with Search Report for corresponding Chinese application No. 201880099424.4 dated Dec. 15, 2022, 19p, in Chinese language.
English language translation of Second Office Action for corresponding Chinese application No. 201880099424.4 dated Dec. 15, 2022, 21p.
Huawei et al., "TS23.502: Clarification about QoS flow management in PDU session related procedures," SA WG2 Meeting #124, S2-179373, Dec. 1, 2017, 34p, US.
Huawei et al., "Conflict handling between handover procedure and QoS flow procedure in 5GC aligning with EPC," SA WG2 Meeting #122 Bis, S2-176434, Aug. 25, 2017, 4p, FR.

* cited by examiner

METHODS, APPARATUS AND SYSTEMS FOR SATISFYING A TIME CONTROL REQUIREMENT IN A WIRELESS COMMUNICATION

RELATED APPLICATION

This application is a continuation of International Application No. PCT/CN2018/115393, filed Nov. 14, 2018, which is hereby incorporated by reference in its entirety.

TECHNICAL FIELD

The disclosure relates generally to wireless communications and, more particularly, to methods, apparatus and systems for satisfying a time control requirement in a wireless communication.

BACKGROUND

The 4th Generation mobile communication technology (4G) Long-Term Evolution (LTE) or LTE-Advance (LTE-A) and the 5th Generation mobile communication technology (5G) face more and more demands. One of the important goals of the 5G system is to support industrial Internet and vertical industry applications. TSN (a time sensitive network (TSN) is relatively mature in vertical industrial systems. This kind of network is designed to meet the strict requirements of industrial applications for both delay and jitter. For example, in industrial control systems, the delay from the data transmitter to the receiver is required to be 5 ms and the jitter is less than 0.2 ms, which means that the data arrives at the receiver from the transmitter, neither too late (more than 5.2 ms) nor too early (less than 4.8 ms). The data will be discarded when it arrives too early or too late.

Although the quality of service (QoS) framework is defined in the 5G system, and each QoS flow has a corresponding QoS parameter, these are still insufficient for the 5G system to support the industrial system/and vertical industry applications based on the TSN network. The assurance process in the existing QoS framework cannot meet such high time accuracy requirements. The time parameters corresponding to each QoS flow are merely estimates without strict time requirements. This will cause several problems. First, in the 5G system, on the network path from the user plane function (UPF) at the entry point of the 5G network to the 5G base station, each media plane network node cannot accurately know how much delay the current message has experienced, and how much time is left for the local processing. Second, the 5G base station cannot judge, in order to guarantee the time requirement, resources corresponding to which time period should be allocated for the air interface, to ensure the jitter demand without being too early or too late. Third, when the message arrives at the 5G user equipment (UE), the UE protocol stack cannot know the delay of the message, cannot know whether the jitter meets the requirement, and thus cannot give an accurate feedback to the network side.

Thus, existing systems and methods for meeting a time control requirement in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first network node is disclosed. The method comprises: generating a timestamp associated with downlink data to be transmitted; and transmitting the downlink data with the timestamp.

In another embodiment, a method performed by a first network node is disclosed. The method comprises: receiving downlink data and a timestamp associated with the downlink data; and transmitting the downlink data based on the timestamp.

In yet another embodiment, a method performed by a wireless communication device is disclosed. The method comprises: generating a timestamp associated with uplink data to be transmitted; and transmitting the timestamp to a first network node for satisfying a time control requirement related to a transmission of the uplink data.

In still another embodiment, a method performed by a first network node is disclosed. The method comprises receiving uplink data and a timestamp associated with the uplink data from a wireless communication device.

In a different embodiment, a method performed by a first network node is disclosed. The method comprises: obtaining time control information for a quality of service (QoS) flow that is generated for data transmissions between a wireless communication device and at least one network node; and transmitting the time control information to at least one of: the wireless communication device and the at least one network node.

In another embodiment, a method performed by a first network node is disclosed. The method comprises receiving a request for handover of a wireless communication device, wherein the request carries time control information for a quality of service (QoS) flow that is generated for data transmissions between the wireless communication device and a second network node.

In a different embodiment, a network node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
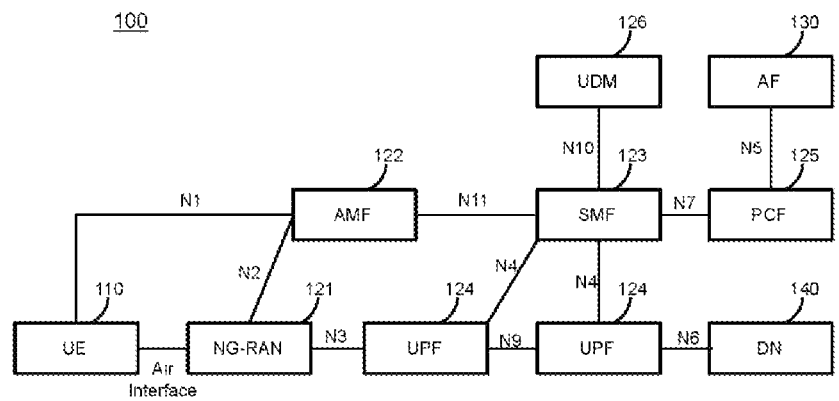
FIG. 1 illustrates an exemplary architecture diagram of a 5G system in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS. A 5G BS may be located at the network side that includes various network nodes, e.g. next generation radio access network (NG-RAN) base station, user plane function (UPF), session management function (SMF), access and mobility control function (AMF), etc.

The present teaching discloses various systems and methods for satisfying time control requirements related to a data transmission between a UE and different network nodes. In one embodiment, when the downlink user plane data reaches the 5G network entry UPF, i.e. the UPF connecting to data network (DN), the UPF adds a timestamp to the forwarded message. After the data reaches the 5G base station NG-RAN, the NG-RAN may also carry the timestamp in the data sent to the UE. In the media plane data sent by the UPF to the NG-RAN, the timestamp may be marked in the GPRS Tunneling Protocol (GTP) header or directly added to the user plane data header. The NG-RAN may mark the timestamp in the Packet Data Convergence Protocol (PDCP) packet or the SDAP (Service Data Adaptation Protocol) packet in the data sent to the UE.

In another embodiment, a UE generates a timestamp when the UE is ready to transmit uplink data. The UE requests an uplink data resource from the base station, and sends the data to the base station according to the uplink resource. The UE may send the timestamp to the base station when requesting the resource, or send the timestamp to the base station in the PDCP message or the SDAP message when the uplink data is sent. When the NG-RAN forwards the packet to the UPF, it carries the timestamp, which may be marked in the GTP protocol header or directly added to the user plane data header. The UPF on the path may schedule the message transmission based on the received timestamp. The UPF connected to the N6 interface can continue to carry the timestamp in the data when forwarding the data to the data network (DN).

In yet another embodiment, during the process of establishing or modifying the QoS flow, the SMF sends the time control information associated with the QoS flow to the UE, the NG-RAN and the UPF. The SMF may obtain the time control information from the PCF or from a local configuration of the time control information. The time control information includes at least one of the following: delay, jitter range, time sensitivity indication. A time sensitivity indication is indicated by at least one of: an independent time sensitivity indicator; a specific class of QoS; and a specific value of a QoS identifier. In another embodiment, when the handover occurs in the 5G system, time control information corresponding to the QoS flow is sent to the target base station.

In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary architecture diagram of a 5G system 100 in which techniques disclosed herein may be implemented, in accordance with an embodiment of the present disclosure. As shown in FIG. 1, the 5G system 100 includes at least one UE 110, a base station next generation radio access network (NG-RAN) 121, an access and mobility control function (AMF) 122, a session management function (SMF) 123, at least one user plane function (UPF) 124, a policy control function (PCF) 125, a unified data management (UDM) 126, an application function (AF) 130, and a data network (DN) 140.

The network nodes or elements in the architecture are described as follows. The terminal or UE 110 obtains the service through the wireless air interface of the 5G network. The terminal 110 exchanges information through the air interface with the base station 121, and exchanges information with the management entities (e.g. the AMF 122, the SMF 123) of the core network through the non-access stratum (NAS) signaling. The 5G base station (NG-RAN) 121 is responsible for resource scheduling and connection management of the air interface for the terminal 110 to access network. The next generation base station may be a new radio access technology (gNB) or an enhanced LTE technology (eLTE).

The AMF 122 is a common control plane function in the core network. For the 3GPP access, a user has only one AMF, which is responsible for authentication, authorization, and subscription checking of the user to ensure that the user is a legitimate user. The user mobility management includes location registration and temporary identity allocation. When the user initiates a request for establishing a Packet Data Unit (PDU) session, the AMF 122 selects an appropriate SMF, forwards non-access stratum (NAS) signaling between the UE and the SMF 123, and forwards the Access Stratum (AS) signaling between the base station 121 and the SMF 123.

The SMF 123 interacts with the terminal 110, and is mainly responsible for processing the PDU session establishment, modification, and deletion requests, selecting the UPF, and establishing the user plane connection from the UE to the UPF, and determining the QoS parameters of the session with the PCF 125.

The UPF 124 provides user plane processing functions, including data forwarding and QoS execution. The UPF 124 also provides user plane anchors during a movement of a user to ensure business continuity. There may be one or more UPFs on the path from the UE 110 to the DN 140. The media plane data between the two UPFs and between the UPF and the 5G base station are encapsulated in the GTP-U (GPRS Tunneling Protocol user plane) protocol for transmission.

The PCF 125 supports a unified policy framework, provides resource authorization, and provides policy rules to the control plane. The UDM 126 stores user subscription data. The AF 130 provides business functions, and can request resource authorization from the PCF 125.

The DN 140 provides a data network for a business. In the context of the present teaching, a DN may be a network in which the industrial system/and vertical industry application is located. The service data of the industrial system and vertical industry application reaches the 5G network UPF through the N6 interface, and finally reaches the UE through the UPF, NG-RAN for downlink transmission, and vice versa for the uplink transmission.

A QoS framework is defined in the 5G system. The UE 110 can request to establish a PDU session, where a default QoS flow is established in the process. Then the UE or the network can add a new dedicated QoS flow in the PDU session through a PDU session modification process. Each QoS flow has a corresponding QoS parameter, such as 5G QoS identifier (5QI), guaranteed bandwidth (for GBR-type QoS flow), packet delay budget (PDB) for the delay from the UE to the UPF at the entrance/exit of the 5G network (i.e. the UPF connected to the N6 interface), the packet error rate (PER), the filter set, etc.

During the process of UE requesting to establish a PDU session, or during the PDU session modification process, the SMF 123 obtains the QoS parameters from the PCF 125 and sends at least part of the QoS parameters to the UE 110, the NG-RAN 121, and the UPF 124. For example, the filter set, the uplink and downlink bandwidth is sent to the UPF 124; the uplink and downlink bandwidth, PDB, PER, etc. are sent to the NG-RAN 121, and the filter set, the priority, the uplink and downlink bandwidth, etc. are sent to the UE 110.

Time synchronization is needed between network nodes in the TSN network, where each node needs to be synchronized by the gPTP protocol with the master clock in the network to achieve synchronization between nodes. After the internal network nodes (such as UPF, SMF, NG-RAN) and 5G UEs of the 5G network are synchronized with the master clock, the local times at the UPF, SMF, NG-RAN and UE are consistent with at most a negligible error.

Figure 2:
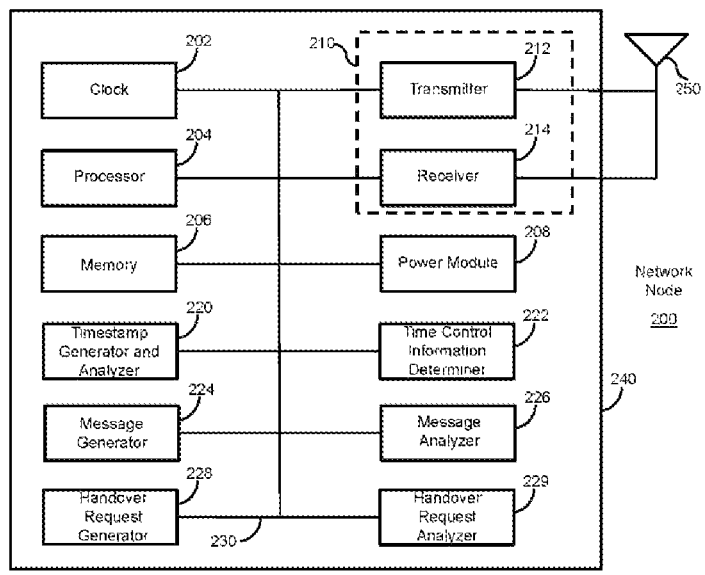
FIG. 2 illustrates a block diagram of a network node, in accordance with some embodiments of the present disclosure.

FIG. 2 illustrates a block diagram of a network node 200, in accordance with some embodiments of the present disclosure. The network node 200 is an example of a network node that can be configured to implement the various methods described herein. As shown in FIG. 2, the network node 200 includes a housing 240 containing a system clock 202, a processor 204, a memory 206, a transceiver 210 comprising a transmitter 212 and receiver 214, a power module 208, a timestamp generator and analyzer 220, a time control information determiner 222, a message generator 224, a message analyzer 226, a handover request generator 228, and a handover request analyzer 229.

In this embodiment, the system clock 202 provides the timing signals to the processor 204 for controlling the timing of all operations of the network node 200. The processor 204 controls the general operation of the network node 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the network node 200 to transmit and receive data to and from a remote device (e.g., another network node or a UE). An antenna 250 is typically attached to the housing 240 and electrically coupled to the transceiver 210. In various embodiments, the network node 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

According to various embodiments, the network node 200 may be a specific network node, where each of the timestamp generator and analyzer 220, the time control information determiner 222, the message generator 224, the message analyzer 226, the handover request generator 228, and the handover request analyzer 229 may be included, not included, or optionally included in the specific network node. In one embodiment, the network node 200 may serve as a UPF which includes the timestamp generator and analyzer 220 configured for generating a timestamp for a transmission of downlink data. The timestamp indicates a time when the network node 200 obtains or transmits the downlink data. The transmitter 212 in this example transmits the downlink data with the timestamp to another network node, e.g. an NG-RAN. The timestamp may be transmitted in a downlink data packet corresponding to a quality of service (QoS) flow, for satisfying a time control requirement related to the QoS flow.

In another embodiment, the network node 200 may serve as an NG-RAN which includes the timestamp generator and analyzer 220 configured for receiving and analyzing downlink data with a timestamp from a second network node, e.g. a UPF. The timestamp indicates a time when the second network node obtains or transmits the downlink data. The transmitter 212 in this example transmits the downlink data based on the timestamp to a UE. The time control information determiner 222 in this example can determine time control information corresponding to a QoS flow in which the downlink data is transmitted, wherein the downlink data is transmitted based on the timestamp and the time control information.

In yet another embodiment, the network node 200 may serve as an NG-RAN which includes the timestamp generator and analyzer 220 configured for receiving uplink data and a timestamp from a UE. The timestamp indicates a time when service data in the uplink data is created. The receiver 214 in this example can receive a request for uplink transmission resource from the UE, wherein the request carries the timestamp. The time control information determiner 222 in this example can determine time control information corresponding to a QoS flow in which the uplink data is received. The transmitter 212 in this example can transmit the uplink data based on the timestamp and the time control information to a second network node, e.g. a UPF. The second network node transmits the uplink data with the timestamp to a third network node, e.g. a DN. The timestamp may be used by the third network node to determine whether the uplink data satisfies a time control requirement corresponding to the QoS flow.

In a different embodiment, the network node 200 may serve as an SMF which includes the time control information determiner 222 configured for obtaining time control information for a QoS flow that is generated for data transmissions between a UE and at least one network node (e.g. a RAN and/or a UPF), and transmitting, via the transmitter 212, the time control information to at least one of: the UE and the at least one network node. In one example, the time control information comprises information related to at least one of: a delay requirement for a data transmission in the QoS flow; a jitter range with respect to the delay requirement; and a time sensitivity indication. The time sensitivity indication is indicated by at least one of: an independent time sensitivity indicator; a specific class of QoS; and a specific value of a QoS identifier. The QoS flow may be at least one of: a default QoS flow generated in response to a newly established session; a specific QoS flow generated in response to a modification of an established session; and a revised QoS flow generated based on an existing QoS flow in response to a modification of an established session.

In one example, the at least one network node comprises a second network node (e.g. a UPF) that, based on the time control information, generates a timestamp for data to be transmitted by the second network node. The message generator 224 in this example may be configured for generating and transmitting, via the transmitter 212, a first message and a second message to a third network node, e.g. an AMF. At least one of the first message and the second message carries the time control information. The second message may be transmitted to a fourth network node, e.g. a RAN, while the first message may be transmitted to the UE, e.g. through the NG-RAN.

In one embodiment, the message analyzer 226 in the third network node, e.g. the AMF, is configured for analyzing the two messages, and embedding the first message into the second message and transmitting, via the transmitter 212, the second message to the fourth network node, e.g. the NG-RAN. The fourth network node may then transmit the first message to the UE.

The handover request generator 228 in the network node 200 may be configured for generating and transmitting, via the transmitter 212, a request for handover of the UE to a target network node, where the request carries the time control information. In one embodiment, the network node 200 may serve as a source network node for the handover. In another embodiment, one of the at least network node serves as a source network node for the handover and includes the handover request generator 228 for generating and transmitting, via the transmitter 212, a request for handover of the UE to a target network node, where the request carries the time control information.

In another embodiment, the network node 200 serves as a target network node for a handover and includes the handover request analyzer 229 for receiving a request for handover of a UE, wherein the request carries time control information for a QoS flow that is generated for data transmissions between the UE and the source network node. The time control information comprises information related to at least one of: a delay requirement for a data transmission in the QoS flow; a jitter range with respect to the delay requirement; and a time sensitivity indication.

The power module 208 can include a power source such as one or more batteries, and a power regulator, to provide regulated power to each of the above-described modules in FIG. 2. In some embodiments, if the network node 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the network node 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the timestamp generator and analyzer 220. Conversely, each of the modules illustrated in FIG. 2 can be implemented using a plurality of separate components or elements.

Figure 3:
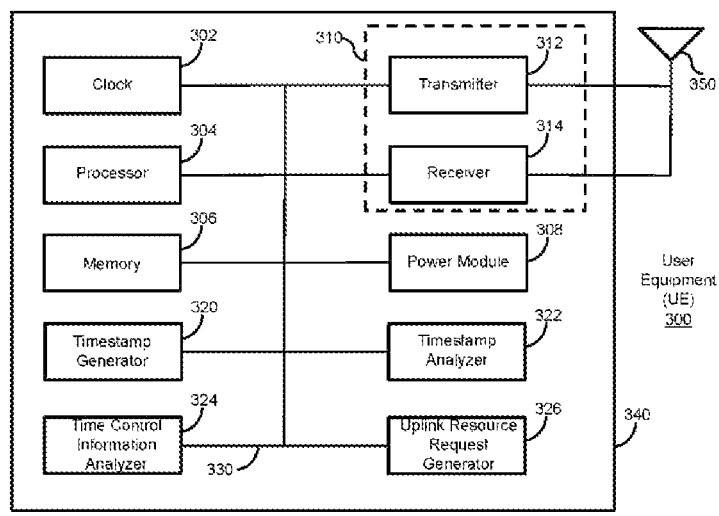
FIG. 3 illustrates a block diagram of a user equipment (UE), in accordance with some embodiments of the present disclosure.

FIG. 3 illustrates a block diagram of a UE 300, in accordance with some embodiments of the present disclosure. The UE 300 is an example of a device that can be configured to implement the various methods described herein. As shown in FIG. 3, the UE 300 includes a housing 340 containing a system clock 302, a processor 304, a memory 306, a transceiver 310 comprising a transmitter 312 and a receiver 314, a power module 308, a timestamp generator 320, a timestamp analyzer 322, a time control information analyzer 324, and an uplink resource request generator 326.

In this embodiment, the system clock 302, the processor 304, the memory 306, the transceiver 310 and the power module 308 work similarly to the system clock 202, the processor 204, the memory 206, the transceiver 210 and the power module 208 in the network node 200. An antenna 350 or a multi-antenna array 350 is typically attached to the housing 340 and electrically coupled to the transceiver 310.

The timestamp generator 320 in this example may generate a timestamp for a transmission of uplink data, wherein the timestamp indicates a time when service data in the uplink data is created. The timestamp generator 320 may transmit, via the transmitter 312, the timestamp to a first network node, e.g. the NG-RAN, for satisfying a time control requirement related to the transmission of uplink data. In one embodiment, the transmitter 312 in this example may transmit the uplink data to the first network node, wherein the uplink data carries the timestamp.

In one embodiment, the timestamp analyzer 322 in this example receives, via the receiver 314, a timestamp with downlink data from a base station. The timestamp analyzer 322 may analyze the timestamp to determine whether the downlink data satisfies a time control requirement corresponding to a QoS flow in which the downlink data is transmitted.

In one embodiment, the time control information analyzer 324 in this example receives and analyzes time control information from a network node, e.g. the SMF, for determining whether the downlink data satisfies a time control requirement corresponding to a QoS flow in which the downlink data is transmitted.

In another embodiment, the uplink resource request generator 326 in this example is configured for transmitting, via the transmitter 312, a request for uplink transmission resource to the first network node, e.g. the NG-RAN, wherein the request carries the timestamp.

The various modules discussed above are coupled together by a bus system 330. The bus system 330 can include a data bus and, for example, a power bus, a control signal bus, and/or a status signal bus in addition to the data bus. It is understood that the modules of the UE 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the timestamp generator 320. Conversely, each of the modules illustrated in FIG. 3 can be implemented using a plurality of separate components or elements.

Different embodiments of the present disclosure will now be described in detail hereinafter. It is noted that the features of the embodiments and examples in the present disclosure may be combined with each other in any manner without conflict.

In one embodiment, the network can put a timestamp in the forwarded message when the downlink user plane data reaches the 5G network entry UPF (the UPF connected to DN). After the data reaches the 5G base station NG-RAN, the NG-RAN also carries the timestamp in the data sent to the UE. In the media plane data sent by the UPF to the NG-RAN, the timestamp may be marked in the GTP protocol header or directly added to the user plane data header. The NG-RAN may mark the timestamp in the Packet Data Convergence Protocol (PDCP) packet or the SDAP (Service Data Adaptation Protocol) packet in the data sent to the UE.

Figure 4:
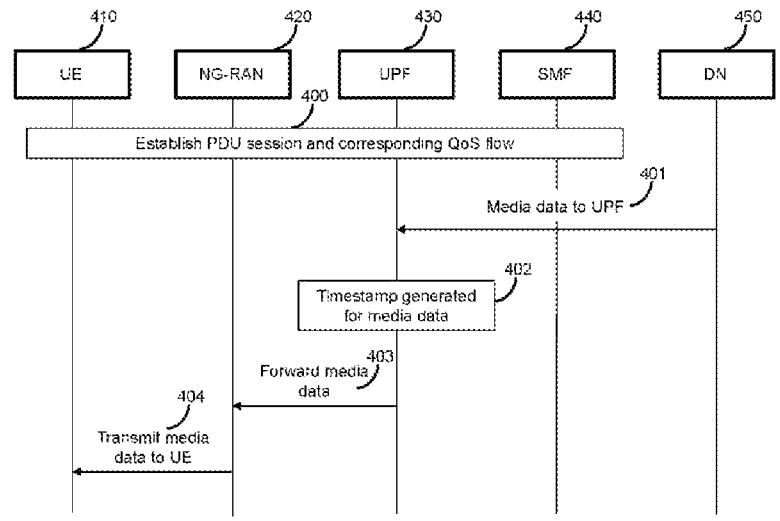
FIG. 4 illustrates an exemplary method for processing downlink data, in accordance with an embodiment of the present disclosure.

FIG. 4 illustrates an exemplary method for processing downlink data, in accordance with an embodiment of the present disclosure. At operation 400, the UE 410 has established a PDU session and a corresponding QoS flow. At operation 401, the application data or media plane data reaches the UPF 430 through the N6 interface. The UPF 430 finds the QoS flow in the PDU session corresponding to the downlink data according to the filtering rule. At operation 402, the UPF 430 adds a timestamp to the media plane data. The timestamp can be in the media data or in the protocol header of the GTP-U tunnel. At operation 403, the UPF 430 forwards the media data to the 5G base station 420 in the QoS flow in the corresponding PDU session, where the timestamp is included. The timestamp can be in the media data or in the protocol header of the GTP-U tunnel of the QoS flow. The data may be sent directly to the base station 420 by the UPF 430, or may eventually reach the base station through the intermediate UPF(s). At operation 404, the base station NG-RAN 420 determines the reasonable transmission time according to the received timestamp and the QoS parameter characteristics of the QoS flow (such as delay PDB, time jitter range), and transmits the media data to the UE 410. The NG-RAN 420 may also send the received timestamp to the UE 410, where the timestamp is marked in a Packet Data Convergence Protocol (PDCP) packet, or marked in a Service Data Adaptation Protocol (SDAP) packet. After receiving the packet, the UE 410 determines whether the delay or jitter is met according to the timestamp to determine whether to use or discard the received data.

In one embodiment, the UE generates a timestamp when the UE is ready to transmit uplink data. The UE requests an uplink data resource from the base station, and sends the data to the base station according to the uplink resource. The UE may send the timestamp to the base station when requesting the resource, or send the timestamp to the base station in the PDCP message or the SDAP message when the uplink data is sent. When the NG-RAN forwards the packet to the UPF, it carries the timestamp, which may be marked in the GTP protocol header or directly added to the user plane data header. The UPF on the path may schedule the message transmissions based on the received timestamp. The UPF connected to the N6 interface can continue to carry the timestamp in the data when forwarding the data to the DN.

Figure 5:
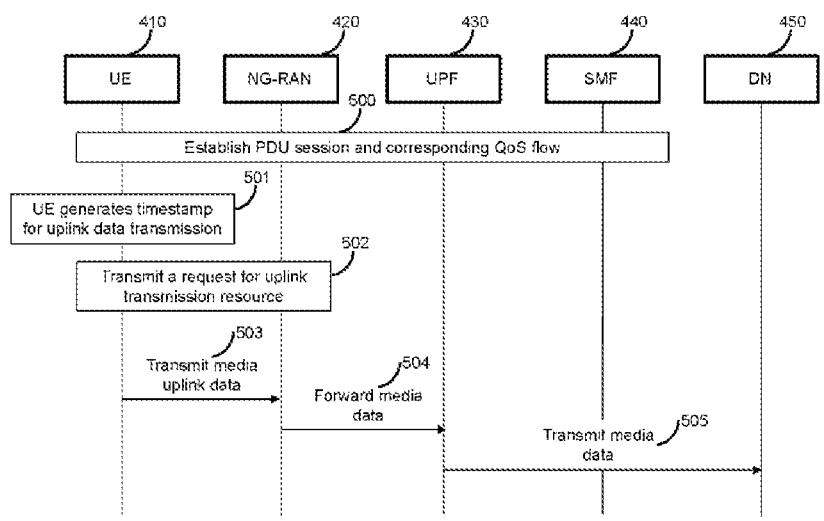
FIG. 5 illustrates an exemplary method for processing uplink data, in accordance with an embodiment of the present disclosure.

FIG. 5 illustrates an exemplary method for processing uplink data, in accordance with an embodiment of the present disclosure. At operation 500, the UE 410 has established a PDU session and a corresponding QoS flow. At operation 501, the UE 410 prepares to send uplink data, and obtains a timestamp. At operation 502, the UE 410 requests a resource from the base station 420 by an RRC (Radio Resource Connection) protocol, where the timestamp generated by the UE may be carried with the request. At operation 503, the UE 410 sends uplink data to the base station 420, where the timestamp may also be carried. The timestamp is marked in the PDCP packet or in the SDAP packet. At operation 504, the base station 420 sends uplink data to the UPF 430 in the QoS flow in the PDU session corresponding to the UE. The uplink data can also carry a timestamp. The timestamp can be in the media data or in the protocol header of the GTP-U tunnel of the QoS flow. There may be multiple UPFs on this path. The UPF can schedule the transmission of data according to the received timestamp. At operation 505, the UPF sends the data to the DN 450 through the N6 interface. The timestamp can also be carried in the data.

In one embodiment, in the process of establishing a QoS flow, the SMF sends time control information associated with the QoS flow to the UE, the NG-RAN and the UPF. The SMF may obtain time control information from the PCF or locally configure the time control information. The time control information includes information related to at least one of the following: delay, jitter range, time sensitivity indication. A time sensitivity indication can be indicated by an independent time-sensitive indicator, a specific class of QoS, and/or a specific 5QI value.

Figure 6:
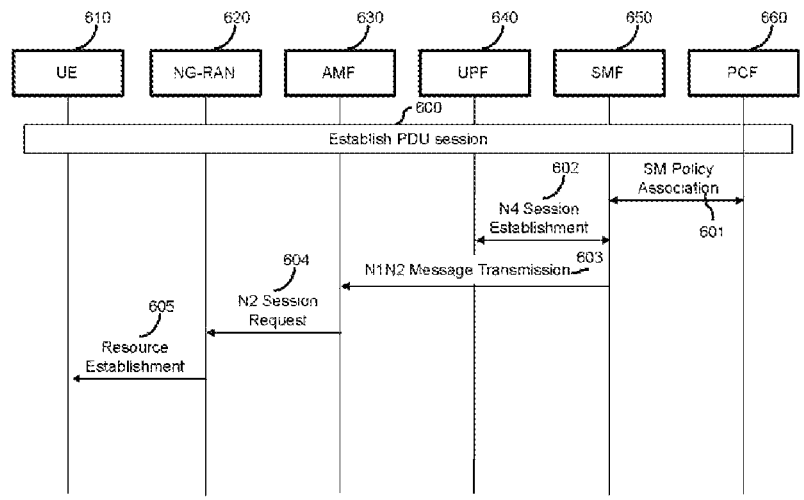
FIG. 6 illustrates an exemplary method for configuring time control information during a session establishment, in accordance with an embodiment of the present disclosure.

FIG. 6 illustrates how time control information associated with the default QoS flow is sent to the UE, RAN, and UPF, during PDU session establishment, in accordance with an embodiment of the present disclosure. At operation 600, the UE 610 initiates a PDU session establishment process. At operation 601, the SMF 650 initiates a session management (SM) policy association establishment process, or an SM policy association modification process, to obtain a QoS parameter corresponding to the default QoS flow. The QoS parameter may contain time control information. The SMF 650 may also configure the time control information corresponding to the QoS flow locally. At operation 602, the SMF 650 sends an N4 session establishment or modification to the UPF 640, where the time sensitivity indication corresponding to the default QoS flow is carried. When the UPF 640 connected to the N6 interface receives the indication, it adds a timestamp to the data entering the network, as discussed before at operation 402. At operation 603, the SMF 650 sends an N1N2 delivery message to the AMF 630, where the N2 message to be sent to the NG-RAN 620 and the N1 message to be sent to the UE 610 are carried. The N2 message carries time control information corresponding to the default QoS flow, including delay and jitter range, and/or time sensitivity indication. The N1 message carries time control information corresponding to the default QoS flow, including delay and jitter range, and/or time sensitivity indication. At operation 604, the AMF 630 sends an N2 session request to the NG-RAN 620, where the time control information received at operation 603 is carried. The N1 message to be sent to the UE 610 is also encapsulated in the N2 message and sent to the NG-RAN 620. At operation 605, the NG-RAN 620 sends the received N1 message to the UE 610 in the process of establishing the resource to the UE 610, where the N1 message carries the time control information. For simplicity, irrelevant operations in the PDU session establishment process are not described.

Figure 7:
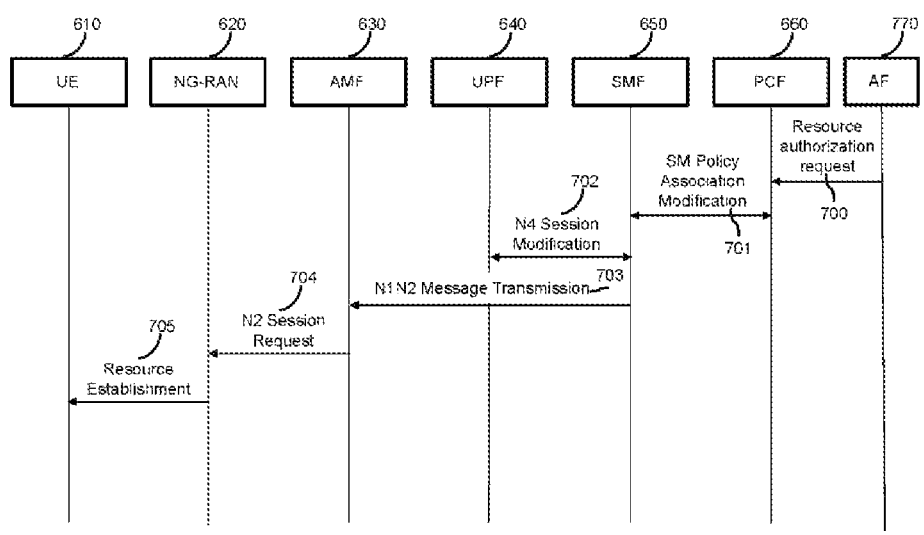
FIG. 7 illustrates an exemplary method for configuring time control information during a session modification, in accordance with an embodiment of the present disclosure.

FIG. 7 illustrates how the time control information associated with the dedicated QoS flow is sent to the UE, RAN, and UPF, during a PDU session modification, in accordance with an embodiment of the present disclosure. At operation 700, the AF 770 initiates a resource authorization request to the PCF 660. At operation 701, the PCF 660 initiates an SM policy association modification process to the SMF 650, and sends updated policy information to the SMF 650. It may contain the time control information corresponding to the new policy. The SMF 650 may also configure the time control information locally. The SMF 650 decides to establish a new dedicated QoS flow or modify the existing QoS flow. At operation 702, the SMF 650 sends an N4 session modification request to the UPF 640, where the time-sensitive indication corresponding to the newly created or modified QoS flow is carried. When the UPF 640 connected to the N6 interface receives the indication, it adds a timestamp to the data entering the network, as discussed before at operation 402.

At operation 703, the SMF 650 sends an N1N2 delivery message to the AMF 630, where the N2 message to be sent to the NG-RAN 620 and the N1 message to be sent to the UE 610 are carried. The N2 message carries time control information corresponding to the newly created or modified QoS flow, including delay and jitter range, and/or time sensitivity indication. The N1 message carries time control information corresponding to the newly created or modified QoS flow, including delay and jitter range, and/or time sensitivity indication. At operation 704, the AMF 630 sends an N2 session request to the NG-RAN 620, where the time control information received at operation 703 is carried. The N1 message to be sent to the UE 610 is also encapsulated in the N2 message and sent to the NG-RAN 620. At operation 705, the NG-RAN 620 sends the received N1 message to the UE 610 in the process of establishing the resource to the UE 610, where the N1 message carries the time control information. For simplicity, irrelevant operations in the PDU session modification process are not described. In one embodiment, the operation 702 may occur after the receipt of operation 705.

Figure 8:
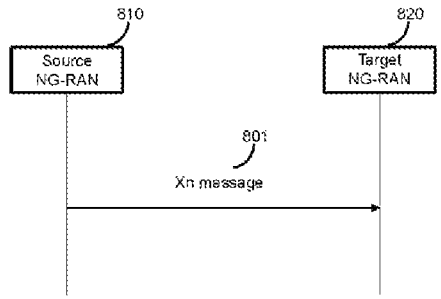
FIG. 8 illustrates an exemplary method for configuring time control information during a handover process, in accordance with an embodiment of the present disclosure.

FIG. 8 illustrates how the time control information associated with the QoS flow is sent to a target RAN during Xn handover, in accordance with an embodiment of the present disclosure. At operation 801, during the Xn handover process, the source NG-RAN 810 carries the time control information corresponding to the QoS flow in the message sent to the target NG-RAN 820. The time control information includes delay and jitter range, and/or time sensitivity indication.

Figure 9:
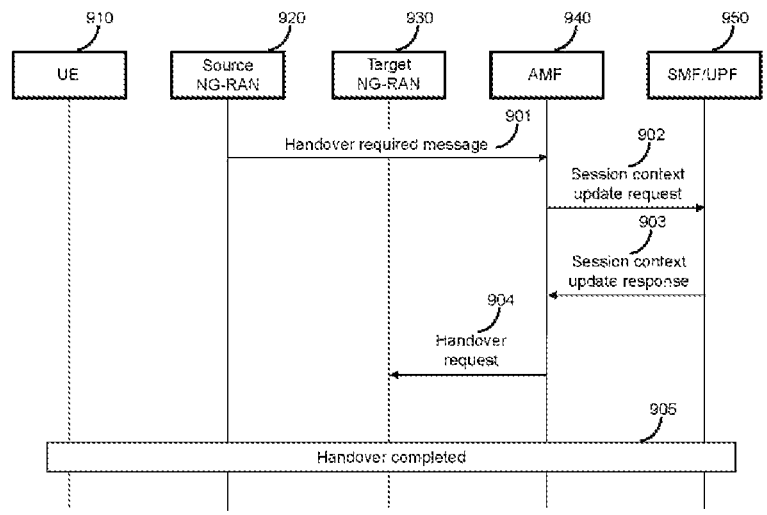
FIG. 9 illustrates an exemplary method for configuring time control information during another handover process, in accordance with an embodiment of the present disclosure.

FIG. 9 illustrates how the time control information associated with the QoS flow is sent to a target RAN during the N2 handover, in accordance with an embodiment of the present disclosure. At operation 901, the source NG-RAN base station 920 sends a Handover Required message to the AMF 940. At operation 902, the AMF 940 sends a session context update request to the SMF 950, requesting to switch or perform the handover. At operation 903, the SMF 950 sends a session context update response to the AMF 940, where the N2 message is carried. In the N2 message, time control information corresponding to the QoS flow is carried, including delay and jitter range, and/or time sensitivity indication. At operation 904, the AMF 940 sends a handover request to the target NG-RAN 930, where the time control information received in operation 903 is carried. At operation 905, the N2 handover process is completed. For simplicity, irrelevant operations in the N2 handover process are not described. In one embodiment, when the AMF 940 changes, the target AMF sends a request to the SMF at operation 902; the target AMF sends a request to the target base station at operation 904.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first network node, the method comprising:
   generating a timestamp associated with downlink data to be transmitted;
   transmitting, in a downlink transmission, the downlink data with the timestamp to a second network node, which forwards, in a downlink transmission, the downlink data according to the timestamp and quality of service (QoS) parameter characteristics for satisfying a time control requirement, the timestamp indicating when the downlink data are obtained or transmitted by the first network node;
   sending a session context update request to a Session Management Function (SMF) or User Plane Function (UPF);
   receiving a session context update response in response; and
   sending a handover request to a target node to trigger a handover process carrying the time control information.

2. The method of claim 1, wherein the timestamp is transmitted in a downlink data packet corresponding to a quality of service (QoS) flow.

3. A method comprising:
   receiving, by the first network node from a second network node, uplink or downlink data and a timestamp associated with the uplink or downlink data;
   determining, by the first network node, time control information corresponding to a quality of service (QoS) flow, in which the uplink or downlink data are received;
   forwarding, by the first network node, the uplink or downlink data with the timestamp to a wireless communication device or a third network node according to the timestamp and the time control information for satisfying a time control requirement, the timestamp indicating when the uplink or downlink data are obtained or transmitted by the second network node;
   sending a session context update request to a Session Management Function (SMF) or User Plane Function (UPF);
   receiving a session context update response in response; and
   sending a handover request to a target node to trigger a handover process carrying the time control information.

4. A method performed by a wireless communication device, the method comprising:
   generating a timestamp associated with uplink data to be transmitted;
   transmitting, in an uplink transmission, the uplink data along with the timestamp to a first network node, which schedules forwarding of the uplink data in an uplink transmission according to the time stamp for satisfying a time control requirement, the timestamp indicating when the uplink data are obtained or transmitted by the wireless communication device;
   sending a session context update request to a Session Management Function (SMF) or User Plane Function (UPF);
   receiving a session context update response in response; and
   sending a handover request to a target node to trigger a handover process carrying the time control information.

5. The method of claim 4, further comprising:
   transmitting a request for uplink transmission resource to the first network node, wherein the request carries the timestamp.

6. The method of claim 3, further comprising:
   receiving a request for uplink transmission resource from the wireless communication device, wherein the request carries the timestamp.

7. The method of claim 3, wherein the third_network node transmits the uplink data to a fourth_network node.

8. The method of claim 7, wherein the timestamp is used by the third network node to determine whether the uplink data satisfies a time control requirement corresponding to the QoS flow.

9. A network node configured to carry out the method of claim 1.

10. A wireless communication device configured to carry out the method of claim 4.

11. A non-transitory computer-readable medium having stored thereon computer-executable instructions for carrying out the method of claim 1.

12. A network node configured to carry out the method of claim 3.

13. A non-transitory computer-readable medium having stored thereon computer-executable instructions for carrying out the method of claim 3.

14. The method of claim 3, wherein the downlink data are transmitted with the timestamp to the wireless communication device.

15. The method of claim 14, wherein the timestamp is used by the wireless communication device to determine whether the downlink data satisfies a time control requirement corresponding to the QoS flow, in which the downlink data is transmitted.

16. The method of claim 3, wherein the time control information comprises information of at least one of:
   a delay requirement for a data transmission in the QoS flow;
   a jitter range with respect to the delay requirement; or
   a time sensitivity indication.

17. The method of claim 16, wherein the time sensitivity indication is indicated by at least one of:
   an independent time sensitivity indicator;
   a specific class of QoS; or
   a specific value of a QoS identifier.

18. The method of claim 3, wherein the QoS flow includes at least one of:
   a default QoS flow generated in response to a newly established session;
   a specific QoS flow generated in response to a modification of an established session; and
   a revised QoS flow generated based on an existing QoS flow in response to a modification of an established session.

19. The method of claim 4, wherein the time control requirement comprises at least one of:

a delay requirement for a data transmission in the QoS flow;

a jitter range with respect to the delay requirement; or a time sensitivity indication.

20. The method of claim 19, wherein the time sensitivity indication is indicated by at least one of:

an independent time sensitivity indicator;

a specific class of QoS; or a specific value of a QoS identifier.

* * * * *